(12) United States Patent
Millsap et al.

(10) Patent No.: US 6,535,806 B2
(45) Date of Patent: *Mar. 18, 2003

(54) TACTILE FEEDBACK CONTROL FOR STEER-BY-WIRE SYSTEMS

(75) Inventors: Scott A. Millsap, Saginaw, MI (US); Timothy W. Kaufmann, Frankenmuth, MI (US); James M. Petrowski, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/960,552

(22) Filed: Sep. 21, 2001

(65) Prior Publication Data

US 2002/0103589 A1 Aug. 1, 2002

Related U.S. Application Data

(60) Provisional application No. 60/265,035, filed on Jan. 30, 2001.

(51) Int. Cl.[7] .................... A01B 69/00; B62D 11/00
(52) U.S. Cl. .................... 701/42; 701/41; 180/443; 180/445; 180/446; 340/465
(58) Field of Search .............. 701/41, 42, 43; 180/422, 443, 446, 445; 340/465

(56) References Cited

U.S. PATENT DOCUMENTS

| 5,568,378 | A  | * | 10/1996 | Wojsznis |
| 6,097,286 | A  | * | 8/2000  | Discenzo ............ 340/465 |
| 6,219,604 | B1 | * | 4/2001  | Dilger et al. ......... 701/41 |
| 6,279,674 | B1 | * | 8/2001  | Lissel et al. ........ 180/402 |
| 6,363,305 | B1 | * | 3/2002  | Kaufmann et al. ..... 701/41 |
| 6,370,460 | B1 | * | 4/2002  | Kaufmann et al. ..... 701/41 |
| 2002/0079155 | A1 | | 6/2002 | Andonian et al. |

* cited by examiner

Primary Examiner—Gertrude Arthur
(74) Attorney, Agent, or Firm—Edmund P. Anderson (57) ABSTRACT

A steer-by-wire system includes a steering wheel; a steering wheel sensor coupled to the steering wheel for sensing the position of the steering wheel and producing a signal indicative of the position of the steering wheel; a controller in signal communication with the steering wheel sensor for receiving the signal indicative of the position of the steering wheel from the steering wheel sensor and producing a signal indicative of a desired steering wheel feedback torque; and a tactile feedback device in signal communication with the controller for receiving the signal indicative of the desired steering wheel feedback torque and providing a corresponding torque to the steering wheel.

22 Claims, 5 Drawing Sheets

TACTILE FEEDBACK CONTROL FOR STEER-BY-WIRE SYSTEMS

CROSS-REFERENCE TO RELATED APPLICATION

This application claims the benefit of U.S. Provisional Patent Application serial. No. 60/265,035, filed Jan. 30, 2001, the contents of which are incorporated by reference herein in their entirety.

BACKGROUND

Conventional vehicular steering systems have an articulated mechanical linkage connecting the input device (e.g., steering wheel) to the steering actuator (e.g., steerable road wheels, rudder, etc.). Even with power assist, the operator of such a mechanically linked vehicle can generally feel the forces acting against the actuator through the input device.

Commercial and recreational vehicles, such as those used in construction, agriculture and marine environments, generally require the input of steering commands through a steering wheel to accomplish directional control. For many of these vehicles, the actuating device or controlled surface that changes the steering direction is not mechanically connected to the steering wheel. These systems are generally referred to as "steer-by-wire".

For high performance speedboats and construction equipment employing "steer-by-wire" systems, for example, a phase lag may occur when the operator applies a fast steering input at the steering wheel but the directional control actuator has difficulty keeping in correspondence with the operator's steering command. For some large construction equipment, for example, the directional control actuator may draw additional power from the vehicle's energy supply source in order to keep up with the steering input command, but this additional power drain may reduce the power available to other vehicular systems.

SUMMARY

In an exemplary embodiment, a steer-by-wire system includes a steering wheel; a steering wheel sensor coupled to the steering wheel for sensing the position of the steering wheel and producing a signal indicative of the position of the steering wheel; a controller in signal communication with the steering wheel sensor for receiving the signal indicative of the position of the steering wheel from the steering wheel sensor and producing a signal indicative of a desired steering wheel feedback torque; and a tactile feedback device in signal communication with the controller for receiving the signal indicative of the desired steering wheel feedback torque and providing a corresponding torque to the steering wheel.

DESCRIPTION OF PREFERRED EMBODIMENTS

Figure 1:
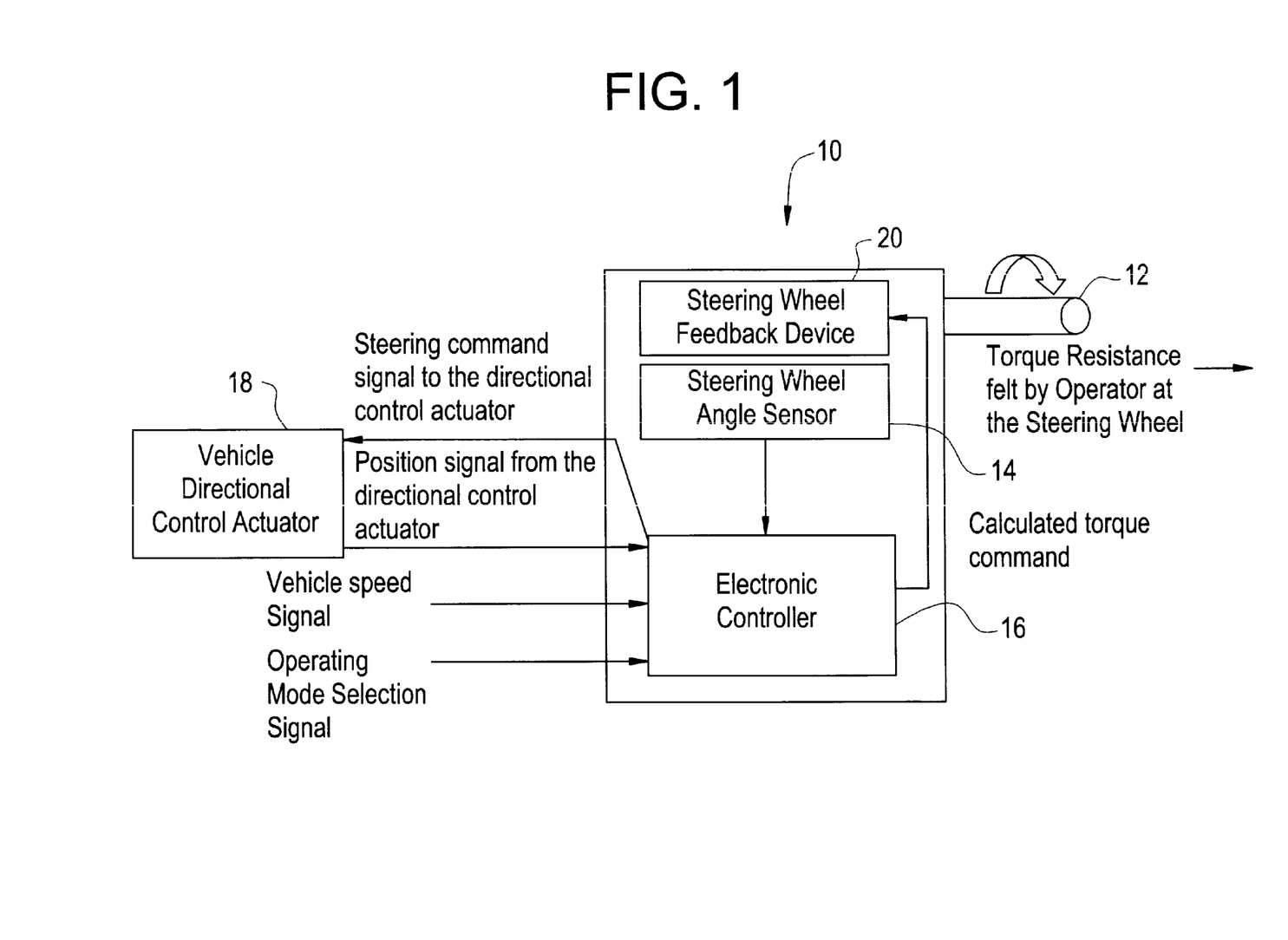
FIG. 1 shows a schematic view of a tactile feedback control steer-by-wire system.

As shown in FIG. 1, a tactile feedback control steer-by-wire system is indicated generally by the reference numeral 10. The system 10 comprises a steering wheel 12, a steering wheel angle sensor 14 disposed relative to the steering wheel 12, an electronic controller 16 in signal communication with the sensor 14, a vehicle directional control actuator 18 in signal communication with the controller 16, and a steering wheel tactile feedback device 20 in signal communication with the controller 16 and coupled to the steering wheel 12.

In operation, the steering wheel tactile feedback device 20 provides mechanical torque resistance to the operator based on a torque resistance command signal from the electronic controller 16. The electronic controller 16 calculates the desired torque resistance command using the steering wheel angle sensor 14, a signal indicative of position received from the directional control actuator 18, and a signal indicative of vehicle speed. The electronic controller 16 also calculates a steering command to the directional control actuator 18 based on the steering wheel angle sensor 14, the signal indicative of vehicle speed, and a signal indicative of an operating mode selection.

Figure 2:
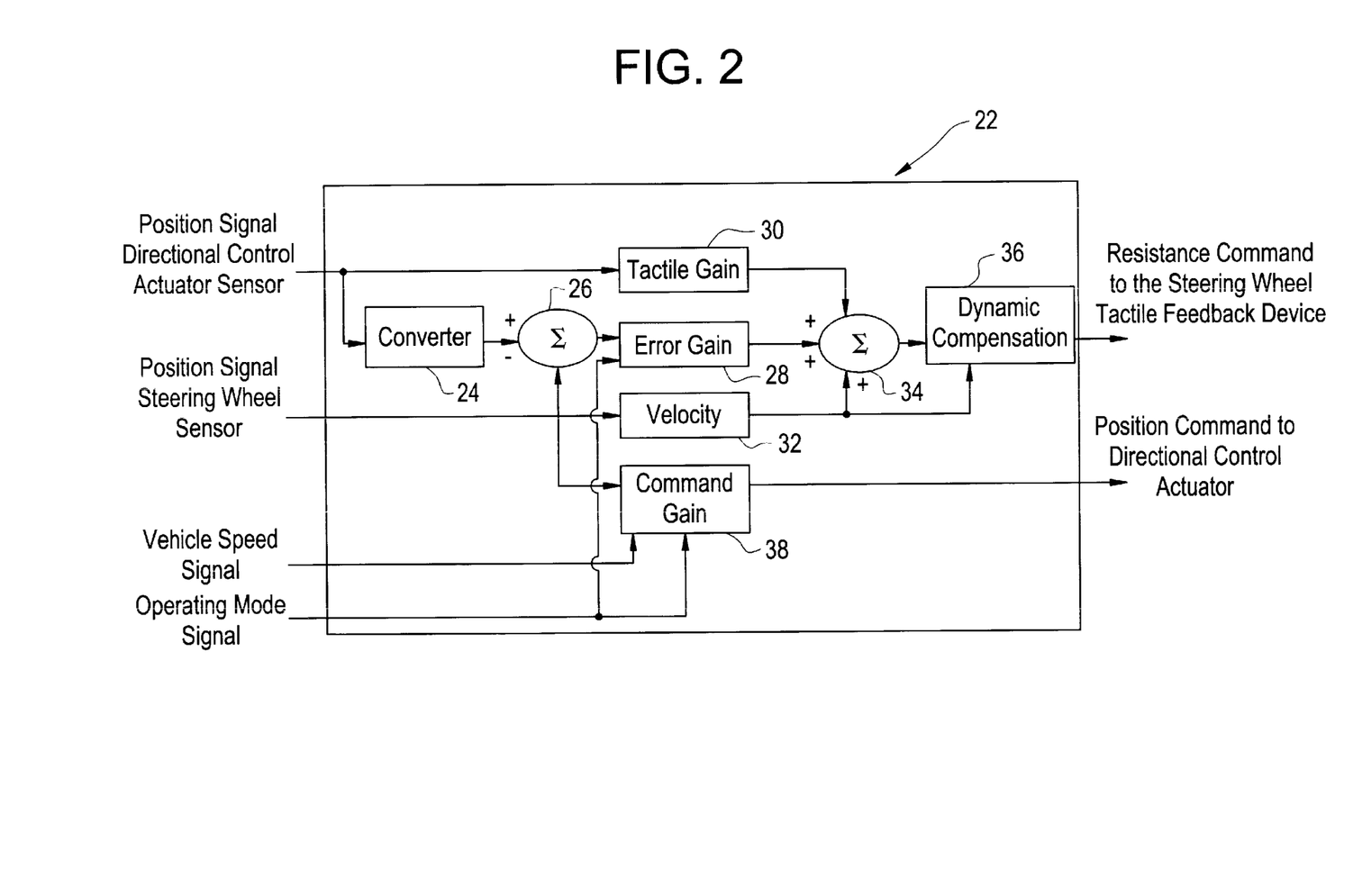
FIG. 2 shows a schematic view of a tactile feedback controller portion for the tactile feedback control steer-by-wire system of FIG. 1 incorporating an actively controlled friction device for providing feedback resistance.

Turning now to FIG. 2, a tactile feedback controller portion embodiment for a tactile feedback control steer-by-wire system having an actively controlled friction device for providing feedback resistance is indicated generally by the reference numeral 22. The controller 22 provides a control command to a resistance device that can actively vary mechanical friction applied to the steering shaft connected to the steering wheel 12 of FIG. 1. The controller 22 receives four input signals, including a direction signal from the directional control actuator 18 of FIG. 1, a direction indicating signal from the steering wheel angle sensor 14 of FIG. 1, a signal indicating the vehicle's forward velocity, and a signal that provides an indication of the selected operating mode of the vehicle. These operating modes may include an operator selected steering performance mode for low speed maneuvering of the vehicle; a steering performance mode for operation at higher vehicle speeds; and an operating mode that activates algorithm features that will assist in limiting the transient level of energy drawn by the steering system.

The controller 22 produces two output control signals, including a torque resistance command signal to the tactile feedback device 20 of FIG. 1, and a computed directional control signal to supply as an input command to the directional control actuator 18.

The controller 22 includes a converter function 24 for receiving the direction-indicating signal from the directional control actuator 18 and converting the signal to an equivalent coordinate system as the direction-indicating signal that measures the steering wheel angle. The converted signal is supplied as the output. A summing function 26 receives two inputs and produces one output. In effect, the summing function 26 performs a comparison of the current value of the indicated position of the directional control device with the current value of the position of the steering wheel, and produces an output that is indicative of the difference or error between these two signals. An error gain function 28 receives a primary input and a secondary input. The primary input is the error signal from the summing function 26 and the secondary input is a signal indicative of an operator-selected mode. The output of the error gain function 28 is a computed component of the torque resistance to be commanded to the tactile resistance device. The error signal from summing function 26 is modified based on a predetermined gain schedule stored within the electronic controller. The output of the function 28 can be modified during system operation to use a different stored gain schedule based on the condition of the operator mode signal corresponding to the secondary input.

A tactile gain function 30 has one input and one output. The input is the position-indicating signal from the directional control actuator 18. A predetermined tactile gain schedule is stored within the electronic controller and implemented by the tactile gain function 30. A feature of the tactile gain function 30 is to compute a component of the commanded torque resistance to the tactile feedback device so as to provide a tactile indication to the operator that the directional control actuator is approaching or has reached the maximum mechanical travel of the directional control actuator.

A velocity function 32 computes an estimate of the velocity of the steering wheel as applied by the operator. The function uses the steering wheel position signal as the input. The velocity is calculated based on sampling the rate of change of the position signal and the computed velocity is provided as an output from this function block. A summing function 34 receives the output signals from function blocks 28, 30 and 32, which are summed to provide a net desired torque resistance command to the tactile feedback device.

A dynamic compensation function 36 receives the signal indicative of the net desired torque resistance command from the summing function 34, and provides dynamic control compensation based on the desired system dynamic behavior of the tactile feedback control device. The dynamic compensation function 36 may be adapted to meet design criteria for various applications, such as, for example, by reversing a pulse-width-modulated ("PWM") current command between PWM cycles to compensate for sticking and/or slipping conditions at about zero velocity caused by residual magnetism of a friction-type tactile feedback device 20. The calculated steering wheel velocity from the velocity function 32 is also supplied as a direct input signal to the dynamic compensation function 36. The dynamic compensation function 36 improves the dynamic performance of the tactile feedback device so as to meet system performance requirements including elimination of any sticking or slipping frictional effects that may exist when the steering wheel approaches zero velocity.

A command gain function 38 has two primary inputs and a secondary control input. The position signal from the steering wheel sensor and the vehicle speed signal are used to calculate the desired directional command to the directional control actuator. A predetermined gain schedule is stored within the electronic controller 16 of FIG. 1 and implemented by the command gain function 38. The gain function 38 calculates the output command signal based on the two primary inputs. The secondary input signal is the operating mode signal. The condition of this input causes the algorithm to switch to a different stored gain schedule to allow for a new output signal to be calculated based on the two primary inputs.

Thus, an activated friction tactile feedback device is responsive to the control signal provided by the algorithm implemented by the controller 22. Alternate technologies may be applied interchangeably with the activated friction device to provide a controlled mechanical friction, such as, for example, electromagnetic brakes and/or magnetorheological ("MR") fluid brakes.

Figure 3:
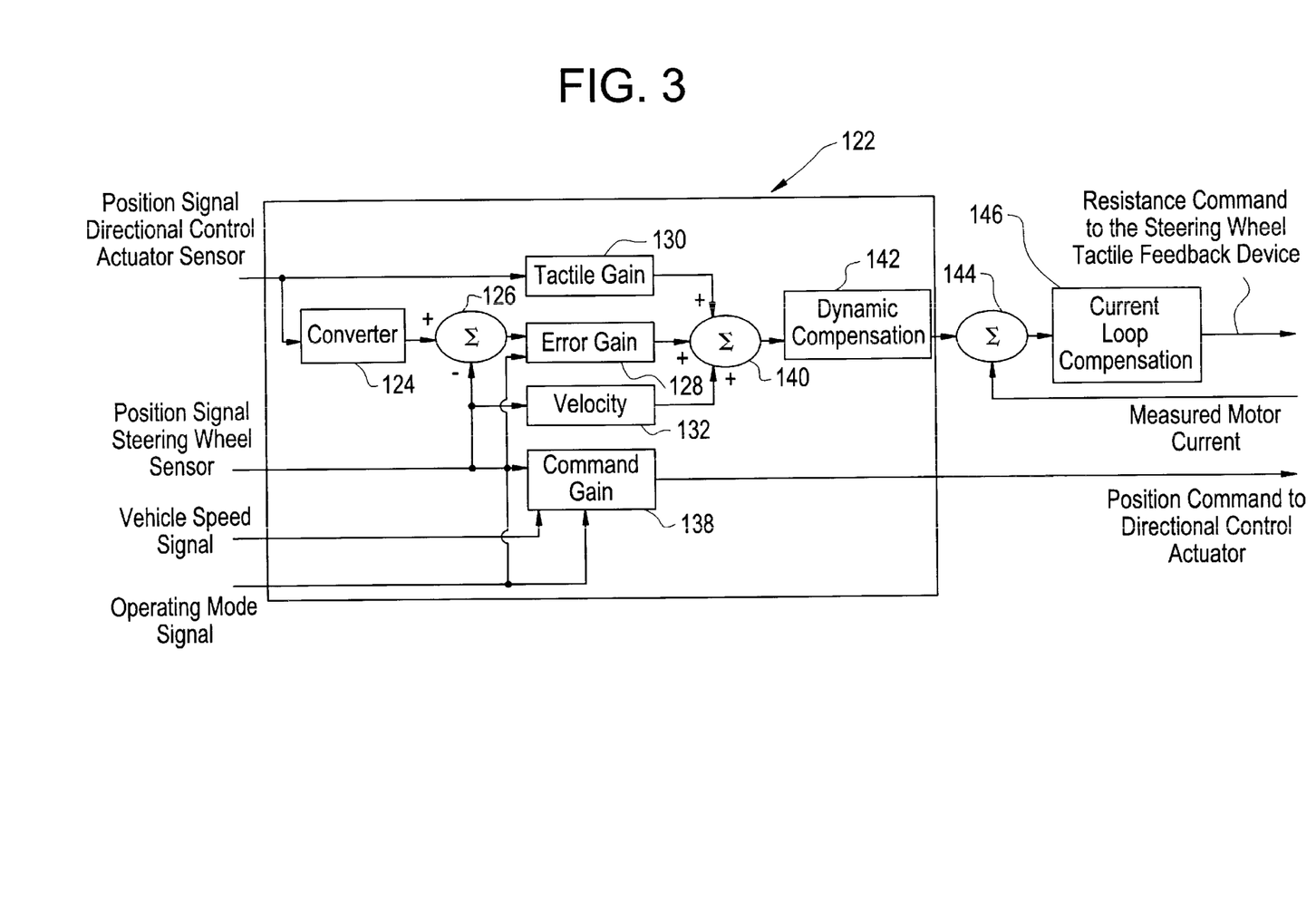
FIG. 3 shows a schematic view of a tactile feedback controller portion for the tactile feedback control steer-by-wire system of FIG. 1 incorporating an actively controlled electric motor for providing feedback resistance.

As shown in FIG. 3, a tactile feedback controller portion embodiment for a tactile feedback control steer-by-wire system having an actively controlled electric motor for feedback resistance is indicated generally by the reference numeral 122. The controller 122 provides a control command to allow for an electric motor to be used as part of the mechanism to resist the applied steering wheel motion from the operator. Most of the functional blocks as described above with respect to FIG. 2 remain functionally similar, and like reference preceded by the numeral "1" are used to indicate like features.

The controller 122 provides a control command to a motor that can actively vary a feedback torque applied to the steering shaft connected to the steering wheel 12 of FIG. 1. The controller 122 receives four input signals, including a direction signal from the directional control actuator 18 of FIG. 1, a direction indicating signal from the steering wheel angle sensor 14 of FIG. 1, a signal indicating the vehicle's forward velocity, and a signal that provides an indication of the selected operating mode of the vehicle. As above, these operating modes may include an operator selected steering performance mode for low speed maneuvering of the vehicle; a steering performance mode for operation at higher vehicle speeds; and an operating mode that activates algorithm features that will assist in limiting the transient level of energy drawn by the steering system.

The controller 122 produces two output control signals, including a torque resistance command signal to the tactile feedback device, and a computed directional control signal to supply as an input command to the directional control actuator 18. The controller 122 includes a converter function 124 for receiving the direction-indicating signal from the directional control actuator 18 and converting the signal to an equivalent coordinate system as the direction-indicating signal that measures the steering wheel angle. The converted signal is supplied as the output. A summing function 126 receives two inputs and produces one output. In effect, the summing function 126 performs a comparison of the current value of the indicated position of the directional control device with the current value of the position of the steering wheel, and produces an output that is indicative of the difference or error between these two signals. An error gain function 128 receives a primary input and a secondary input. The primary input is the error signal from the summing function 126 and the secondary input is a signal indicative of an operator-selected mode. The output of the error gain function 128 is a computed component of the torque resistance to be commanded to the tactile resistance device. The error signal from summing function 126 is modified based on a predetermined gain schedule stored within the electronic controller. The output of the function 128 can be modified during system operation to use a different stored gain schedule based on the condition of the operator mode signal corresponding to the secondary input.

A tactile gain function 130 has one input and one output. The input is the position-indicating signal from the directional control actuator 18. A predetermined tactile gain schedule is stored within the electronic controller and implemented by the tactile gain function 130. A feature of the tactile gain function 130 is to compute a component of the commanded torque resistance to the tactile feedback device so as to provide a tactile indication to the operator that the directional control actuator is approaching or has reached the maximum mechanical travel of the directional control actuator.

A velocity function 132 computes an estimate of the velocity of the steering wheel as applied by the operator. The function uses the steering wheel position signal as the input. The velocity is calculated based on sampling the rate of change of the position signal and the computed velocity is provided as an output from this function block. A summing function 140 receives the output signals from function blocks 128, 130 and 132, which are summed to provide a net desired torque resistance command to the tactile feedback device.

A dynamic compensation function 142 receives the signal indicative of the net desired torque resistance command from the summing function 140, and provides dynamic control compensation based on the desired system dynamic behavior of the tactile feedback control device. A summing function 144 receives the output from the dynamic compensation function 142, and subtracts a signal indicative of a measured motor current. A current loop compensator 146 receives the output from the summing function 144, and produces an output command to the tactile feedback device 120. Thus, the electric motor can be monitored for the level of electric current supplied to the motor by using this signal to augment the net desired commanded torque to improve the dynamic performance of the torque applied by the motor.

The system dynamics of the motor driven tactile feedback device will differ from the case of using a controlled friction device as described above with reference to FIG. 2. The dynamic compensation will be chosen based on these revised dynamic requirements. For example, the dynamic compensator 142 as well as the current loop compensator 146 may be designed to meet a 60-degree phase margin and an 8 dB gain margin for a motor driven tactile feedback device 120. The current loop compensator 146 may be designed in accordance with ramp-type compensation techniques as known to those of ordinary skill in the pertinent art.

The calculated steering wheel velocity from the velocity function 132, which may include a low-pass filter to reduce differentiated noise, is also supplied as a direct input signal to the dynamic compensation function 142. The dynamic compensation function 142 improves the dynamic performance of the motor driven tactile feedback device so as to meet system performance requirements.

A command gain function 138 has two primary inputs and a secondary control input. The position signal from the steering wheel sensor and the vehicle speed signal are used to calculate the desired directional command to the directional control actuator. A predetermined gain schedule is stored within the electronic controller and implemented by the command gain function 138. The gain function 138 calculates the output command signal based on the two primary inputs. The secondary input signal is the operating mode signal. The condition of this input causes the algorithm to switch to a different stored gain schedule to allow for a new output signal to be calculated based on the two primary inputs.

Figure 4:
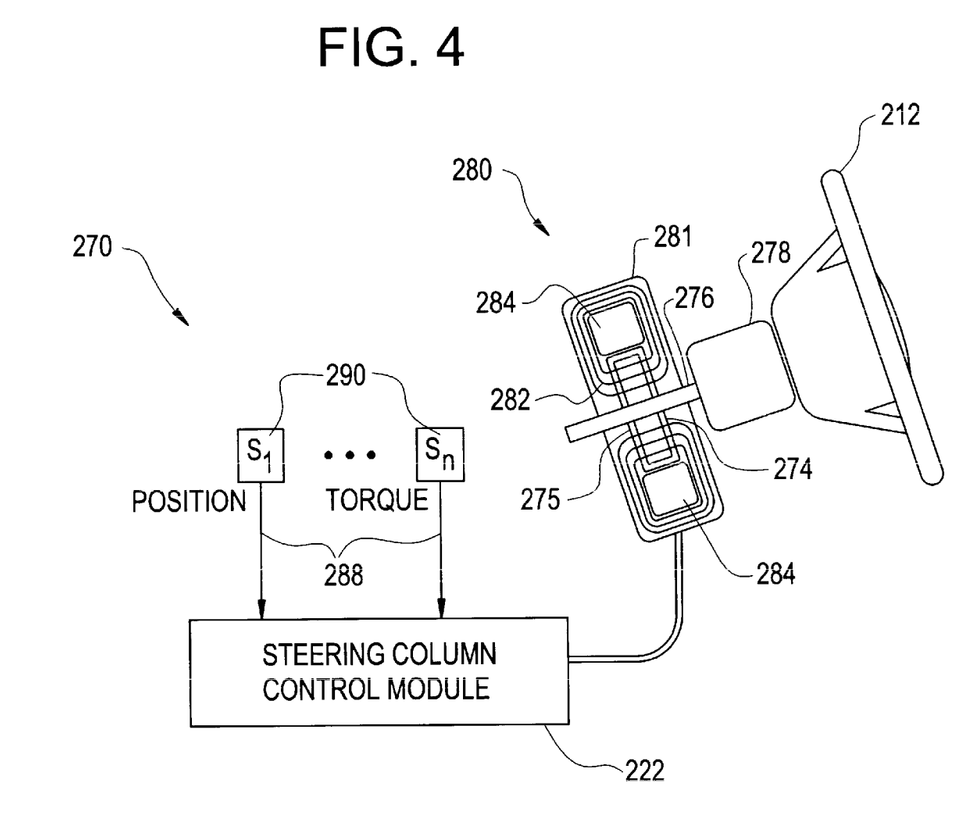
FIG. 4 shows a schematic view of a tactile feedback device for providing feedback resistance in a tactile feedback control steer-by-wire system.

Turning now to FIG. 4, a tactile feedback device embodiment for use in a tactile feedback control steer-by-wire system is indicated generally by the reference numeral 280. In this exemplary embodiment, the tactile feedback device 280 comprises a magnetorheological ("MR") fluid device. A steering wheel 212 is coupled to the tactile feedback device 280 via a steering shaft 276. The tactile feedback device 280 comprises a rotor 284 rotatably mounted within a housing 281 that is filled with a volume of MR fluid 282. The rotor 284 is positioned and shaped to be sensitive and responsive to the mechanical resistance or viscosity of the MR fluid 282. Such responsiveness may be achieved by providing vanes 275 or equivalent surfaces fixedly attached to the rotor so as to cause ever increasing resistance to free rotation thereof in response to increasing viscosity of the MR fluid. A cover member 278 is shown covering the steering shaft 276. The MR fluid 282 has a variable viscosity that is controlled by a magnetic field. A magnetic field generator is therefore provided, which may comprise a wire loop or coil 284 through which current is passed. A control module 222 preferably controls the current within the wire loop 284.

The control module 222 will preferably receive signals 288 from a set of sensors 290. For example, the control module 222 may receive information from position sensors or torque sensors. In this embodiment, the set of sensors 290 is coupled to a set of wheels of a vehicle. The sensed information 288 is processed by the control module 222, which, in turn, causes the current within the wire loop 284 to vary. The variable current then causes varied viscosity or mechanical resistance of the MR fluid 282 contained within the housing 281. The variable resistance is then transferred to the rotor 284, which is mechanically coupled with the steering wheel 212. The vehicle operator feels the resistance to hand movements while gripping the steering wheel 212.

Figure 5:
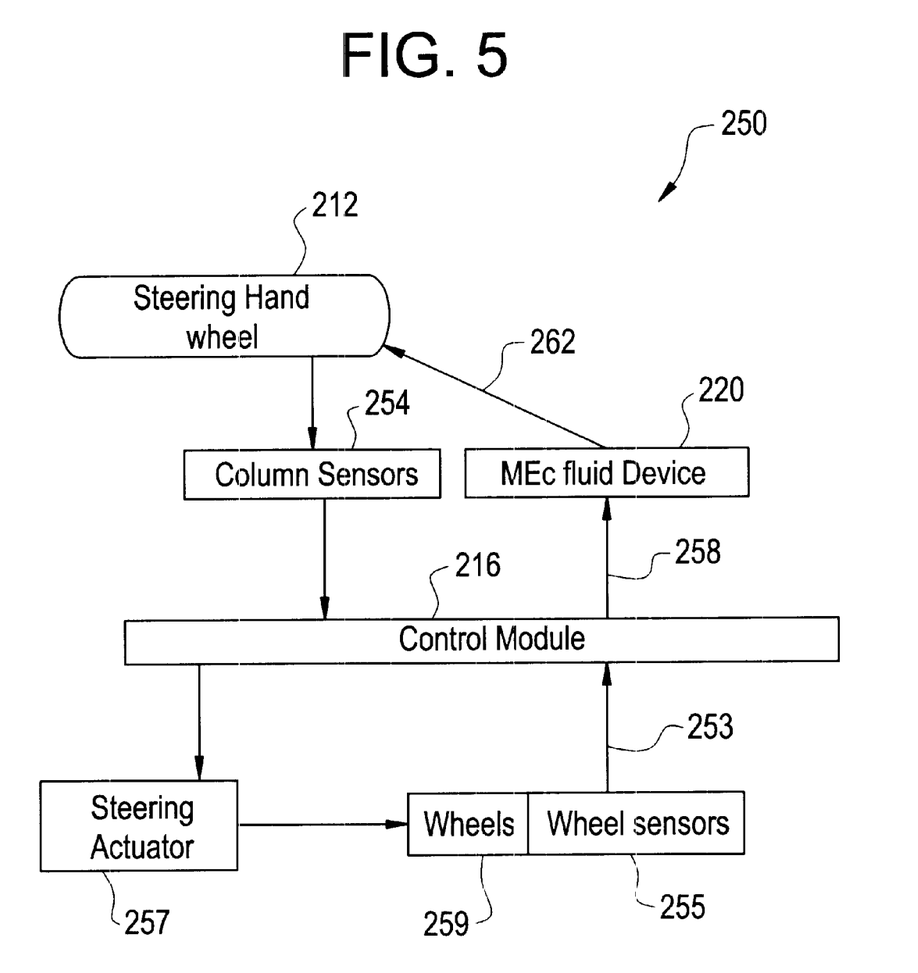
FIG. 5 shows a schematic view of a tactile feedback control steer-by-wire system incorporating the tactile feedback device of FIG. 4.

Referring now to FIG. 5, reference numeral 250 generally indicates a steer-by-wire system embodiment incorporating an MR fluid type of tactile feedback device 220. In operation, a vehicle operator turns the steering wheel 212. The column sensors 254, included in the set of sensors 290 of FIG. 4, sense the desired information and send the information to a control module 222. The control module 222 sends a set of appropriate signals to the steering actuator 257 to effectuate steering of the vehicle wheels 259.

A set of wheel sensors 255, included in the set 290 of FIG. 4, senses wheel feedback and inputs the sensed wheel feedback along line 253. The sensed information may include information such as the speed of the vehicle, the position of the wheels 259 indicating the theoretical or no-slip direction of vehicle movement, and the forces corresponding to interactions with the road surface while the vehicle is moving. The control module 222 takes the sensed information, and filters out a portion of unwanted feedback. The control module 222, in turn, sends filtered information along line 258 to the tactile feedback device 220 depicted in FIG. 4. It is to be noted that the tactile feedback device 220 provides virtually no resistance to a driving column, such as steering shaft 276 as shown in FIG. 4, when there is no magnetic force induced by the control module 222.

However, when it becomes desirable to give the vehicle operator a feel of the road, the control module 222 energizes a magnetic field in the tactile feedback device 220 causing the tactile feedback device 220, in turn, to provide variable resistance, as shown along line 262. The variable resistance, in turn, provides the vehicle operator with a feel of the road by transferring the resistance to the steering wheel 212. Thus, the vehicle operator "feels" or senses the road through the steering wheel 212. The tactile feedback device 220 adds the variable resistance to the steering wheel 212 in a steer-by-wire steering system in order to simulate the road feedback of a conventional mechanical steering system. As can be appreciated, the steering system 257 has no mechanical link to the steering wheel 212. It follows that the vehicle operator would not have a sense or a "feel" of the road in the absence of the tactile feedback device 220. The tactile feedback device 220 provides a feedback to the vehicle operator by varying the resistance on the shaft 276 as shown in FIG. 4.

This disclosure further contemplates that an alternate embodiment steer-by-wire system may have a back-up system with a mechanical link between the steering wheel 212 and the road wheels.

Thus, a motor driven tactile feedback device is responsive to the control signal provided by the algorithm implemented by the controller 22, 122 or 222. Alternate technologies may be combined with the motor driven device, such as, for example, an activated friction device as described above with respect to FIG. 2, to provide additional resistive torque feedback to the steering wheel 12 of FIG. 1.

A tactile feedback control steer-by-wire system is an active system that can control the amplitude of the input steering command to the directional control actuating device as a function of the vehicle's speed, amount of steering input angle, and level of torque applied by the driver. Such a system provides an enhanced capability to improve steering system performance and overcomes limitations of current steer-by-wire systems.

It is to be understood that the term "steering wheel" is merely illustrative and may be generalized to other control devices such as yokes, joysticks, foot pedals and the like. Accordingly, a tactile feedback control according to one or more of the above-described embodiments provides a tactile force feedback to the operator of steer-by-wire systems in order to indicate that the remote actuating device is not capable of maintaining the input steering command velocity applied by the operator. An active feedback mechanism and electronic control system acting to apply resistance at the steering wheel provide tactile indication of this situation to the operator and thus reduce or eliminate the condition of the actuator device "lagging" behind the steering input command. A result of this active feedback is to improve the directional response of the vehicle or vessel to operator steering inputs.

Advantages of a tactile feedback control steer-by-wire system include active management of steering wheel torque based on a differential steering angle; management of commanded velocity of directional control device (slew rate); balanced performance of the directional control device; true feedback to the operator; improved vehicle steering response with correspondingly improved productivity, maneuverability, and workload capacity; reduction of power requirements for the directional control actuator(s); potentially downsized power unit; expanded vehicle functionality, such as provision of customizable and/or operator selectable steering characteristics; and enhancements that allow vehicles such as construction equipment to be more easily steered and controlled during situations where the vehicle must be driven on streets or roadways.

It shall be understood that a person of ordinary skill in the pertinent art may make modifications to the exemplary embodiments described herein without departing from the scope or intent of this disclosure. While the present disclosure has been described by means of example as carried out in exemplary embodiments, the claims are not intended to be limited thereby but to cover the invention broadly within the scope and spirit of the disclosure as a whole.

What is claimed is:

1. A steer-by-wire system comprising:
   a steering wheel;
   a steering wheel sensor disposed relative to said steering wheel for sensing a position thereof and producing a signal indicative of the position of said steering wheel;
   a directional control unit for providing a signal indicative of an actual vehicular direction;
   a controller in signal communication with said steering wheel sensor and said directional control unit, for receiving the signal indicative of the position of said steering wheel from said steering wheel sensor and the signal indicative of the actual vehicular direction from said directional control unit, and producing a signal indicative of a desired steering wheel feedback torque; and
   a tactile feedback device in signal communication with said controller for receiving the signal indicative of the desired steering wheel feedback torque and providing a corresponding torque to said steering wheel.

2. A steer-by-wire system as defined in claim 1, wherein said directional control unit in signal communication with said controller receives a signal indicative of a desired vehicular direction.

3. A steer-by-wire system as defined in claim 2 wherein said controller receives a signal indicative of a vehicular speed.

4. A steer-by-wire system as defined in claim 3 wherein said controller receives a signal indicative of a selected operating mode.

5. A steer-by-wire system as defined in claim 2 wherein said controller receives a signal indicative of a selected operating mode.

6. A steer-by-wire system as defined in claim 5 wherein said controller receives a signal indicative of a vehicular speed.

7. A steer-by-wire system as defined in claim 1 wherein said controller receives a signal indicative of a vehicular speed.

8. A steer-by-wire system as defined in claim 7 wherein said controller receives a signal indicative of a selected operating mode.

9. A steer-by-wire system as defined in claim 1 wherein said controller receives a signal indicative of a selected operating mode.

10. A steer-by-wire system as defined in claim 9 wherein said controller receives a signal indicative of a vehicular speed.

11. A tactile feedback controller for a steer-by-wire system, the feedback controller comprising:
    a tactile gain function;
    an error gain function;
    a first summing function for receiving a tactile gain from said tactile gain function and an error signal from said error gain function, and providing a net resistance command; and
    a dynamic compensation function for receiving said net resistance command from said first summing function, and providing a compensated resistance command to a tactile resistance device.

12. A tactile feedback controller as defined in claim 11, further comprising:
    a converter function; and
    a second summing function in signal communication with said converter function, wherein said error gain function is in signal communication with said second summing function.

13. A tactile feedback controller as defined in claim 11, further comprising:
    a command gain function for receiving signals indicative of steering wheel position, vehicle speed, and selected operating mode, and providing a signal indicative of a desired vehicular direction.

14. A tactile feedback controller as defined in claim 11, further comprising a second summing function in signal communication with said first summing function for receiving a signal indicative of a measured tactile feedback motor current corresponding to a steering wheel torque.

15. A tactile feedback controller as defined in claim 11, wherein said tactile gain function provides said tactile gain in association with a directional signal detected from a directional actuator.

16. A tactile feedback controller as defined in claim 15, wherein said error gain function provides said error signal obtained by comparing said directional signal from said directional actuator with a position signal from a steering device.

17. A method for providing tactile feedback in a steer-by-wire system, the method comprising:

receiving a signal indicative of vehicular direction;

providing a tactile gain in correspondence with the signal indicative of vehicular direction;

receiving a signal indicative of steering wheel position;

converting the signal indicative of vehicular direction into the coordinates of the signal indicative of steering wheel position;

determining the difference between the converted signal and the signal indicative of steering wheel position;

receiving a signal indicative of an operating mode;

providing an error gain in correspondence with the determined difference and the signal indicative of operating mode;

receiving a signal indicative of steering wheel velocity;

summing the tactile gain and the error gain with the signal indicative of steering wheel velocity; and dynamically compensating the summed signal to provide a signal indicative of the desired tactile feedback torque.

18. A method as defined in claim 17 wherein the signal indicative of steering wheel velocity is received by sampling the time rate of change of the signal indicative of steering wheel position.

19. A method as defined in claim 17, further comprising:

subtracting from the summed signal a signal indicative of measured tactile feedback motor current.

20. A method as defined in claim 17, further comprising:

receiving a signal indicative of vehicular speed; and providing a command gain in correspondence with at least one of the signals indicative of steering wheel position, vehicular speed and operating mode to produce a signal indicative of a desired vehicular direction.

21. A tactile feedback controller for a steer-by-wire system, the feedback controller comprising:

means for receiving a signal indicative of vehicular direction;

means for providing a tactile gain in correspondence with the signal indicative of vehicular direction;

means for receiving a signal indicative of steering wheel position;

means for converting the signal indicative of vehicular direction into the coordinates of the signal indicative of steering wheel position;

means for determining the difference between the converted signal and the signal indicative of steering wheel position;

means for receiving a signal indicative of an operating mode;

means for providing an error gain in correspondence with the determined difference and the signal indicative of operating mode;

means for receiving a signal indicative of steering wheel velocity;

means for summing the tactile gain and the error gain with the signal indicative of steering wheel velocity; and means for dynamically compensating the summed signal to provide a signal indicative of the desired tactile feedback torque.

22. A tactile feedback controller as defined in claim 21, further comprising:

means for subtracting from the summed signal a signal indicative of measured tactile feedback motor current to compensate for steering wheel torque.

\* \* \* \* \*